United States Patent [19]

Lecart et al.

[11] 4,047,450
[45] Sept. 13, 1977

[54] SAFETY STEERING-WHEELS FOR AUTOMOTIVE VEHICLES

[75] Inventors: Jean-Guy Pierre Denis Lecart, Saint-Quen-l'Aumone; Jean Claude Amalberti, Suresnes, both of France

[73] Assignee: Chrysler France, Paris, France

[21] Appl. No.: 595,080

[22] Filed: July 11, 1975

[30] Foreign Application Priority Data

Sept. 16, 1974 France .................................. 74.31271

[51] Int. Cl.² ............................................. B62D 1/08
[52] U.S. Cl. ..................................................... 74/552
[58] Field of Search .......................................... 74/552

[56] References Cited

U.S. PATENT DOCUMENTS

| 1,819,707 | 8/1931 | German | 74/552 X |
| 3,555,925 | 1/1971 | Bowser | 74/552 |
| 3,726,147 | 4/1973 | Spietz | 74/552 |

FOREIGN PATENT DOCUMENTS

| 66,774 | 9/1957 | France | 74/552 |
| 1,216,366 | 4/1960 | France | 74/552 |
| 1,151,080 | 1/1958 | France | 74/552 |
| 1,550,192 | 12/1968 | France | 74/552 |
| 1,927,913 | 12/1970 | Germany | 74/552 |
| 1,183,048 | 3/1970 | United Kingdom | 74/552 |

*Primary Examiner*—Samuel Scott
*Assistant Examiner*—Randall Heald
*Attorney, Agent, or Firm*—Steinberg & Blake

[57] ABSTRACT

A safety steering-wheel has a rim situated in front of a central hub of the wheel. Only two legs are fixed to the rim and are inclined therefrom rearwardly toward the central hub, these legs when projected onto a plane which contains the rim extending along radii of the latter which are situated relatively close to each other. At least one of these legs is fixed to the hub. Fixed to the hub or at least one of the above legs is a substantially gallows-shaped complementary portion which is situated in the vicinity of the hub, with this complementary portion situated behind the plane of the rim but forwardly of the hub. The above legs and complementary portion when projected onto a plane which contains the central axis of the hub form a substantially V-shaped configuration, the crest of which is situated adjacent the hub, the complementary portion being inclined oppositely to the legs and extending to the side of the hub axis opposite from the legs. In case of an accident, the crushing force exerted by the driver thrown against the steering-wheel will cause flattening and collapsing of the legs while the complementary portion will absorb the shock of the driver's body before the latter can reach the hub.

8 Claims, 16 Drawing Figures

SAFETY STEERING-WHEELS FOR AUTOMOTIVE VEHICLES

The present invention relates to safety steering-wheels for automotive vehicles.

The steering means of automotive vehicles must compulsorily be provided with a safety device for preventing the crushing, in case of a collision, of the driver's chest against the steering-wheel and/or its perforation by the steering column.

The devices provided for absorbing the shock of the chest against the steering-wheel by means which are integrated to the latter are well known. Some steering-wheels combine a rim and branches or legs liable to be subjected to a permanent deformation with a protecting pad arranged at the centre of the steering-wheel. Unfortunately, such a pad, in order to be efficient, must have very large dimensions, thus obstructing the driver's visibility towards the facia-panel dash and requiring a rather expensive steering-wheel assembly. There has also been proposed, as an anti-shock steering-wheel, a steering-wheel constituted by a rim connected to the hub of the said steering-wheel by two deformable parallel branches or legs near one another leaving the greater part of the rim deprived of any point of attachment with a branch of the steering-wheel. However, although a steering-wheel of this type has, at best, sufficient dynamic absorption capacity when it is in its normal position, i.e., when its two branches in proximity to one another are directed downwardly in a plane practically parallel with the longitudinal centre-line of the vehicle, corresponding to a straight direction of the wheels, the situation is different when the steering-wheel is in other positions, i.e., as soon as the medial plane of the branches is directed obliquely with respect to the vehicle centre-line, or otherwise stated, when the steering-wheel is slightly turned.

The invention relates to a safety steering-wheel of the type provided with a rim mounted much in front of a central hub by means of deformable legs or branches capable of absorbing part of the crushing force of the driver thrown against his steering-wheel in case of an accident, the said steering wheel being characterized in that, being provided with two legs or branches which, seen from above in parallel relationship to the rim, are directed substantially along two radii in proximity to one another leaving the greater part of the rim deprived of any point of attachment with a leg or branch, it also comprises extensions of the said legs which, seen from above in parallel relationship to the rim, extend substantially in the opposite direction to the said legs with respect to the centre of the hub, the said extensions forming a gallows-shaped member inclined to the centre-line of the hub and projecting well beyond the hub behind the rim. In this manner, the invention allows safety steering-wheels to be manufactured economically while at the same time ensuring the driver a normal and quite clear view of the facia-panel and a very good protection against crushing and/or chest perforation in case of an accident when the driver is thrown against the steering-wheel whatever the position of the latter at the time of the accident. Indeed, the safety steering-wheel manufactured according to the invention allows the absorption of the impact energy of the driver's body against the steering-wheel by combined deformation of the steering-wheel legs and the gallows-shaped member extending substantially in prolongation of and in opposition to the said legs, as will appear more clearly from the following description made with reference to the appended drawings illustrating various forms of embodiment of a steering-wheel designed according to the invention.

Figure 3:
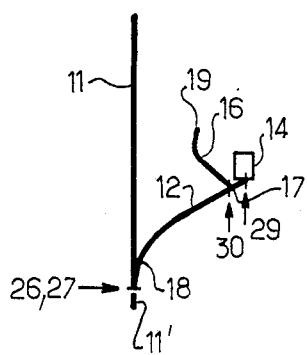
FIGS. 3 and 4 are diagrammatic views corresponding respectively to FIGS. 1 and 2 and illustrating the same steering-wheel.
Figure 4:
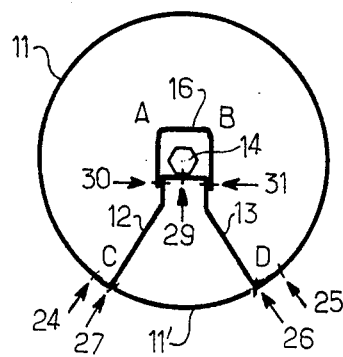

four other forms of embodiment are also illustrated by the same diagrammatic representation as the form of embodiment illustrated in FIGS. 3 and 4, in FIGS. 9-10, 11-12, 13-14 and 15-16.

Figure 1:
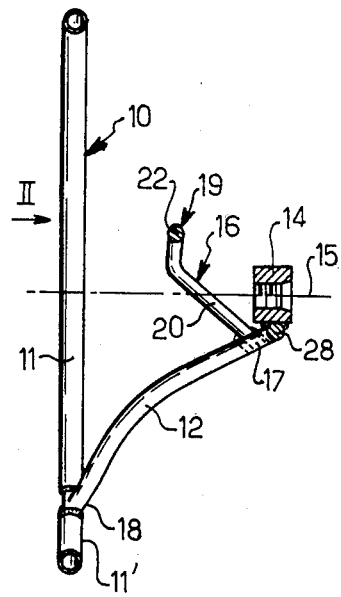
FIG. 1 is a sectional view in a plane containing the centre-line of the steering-wheel and situated midway between the two steering-wheel legs taken along line I—I FIG. 2 in the direction of the arrows.
Figure 2:
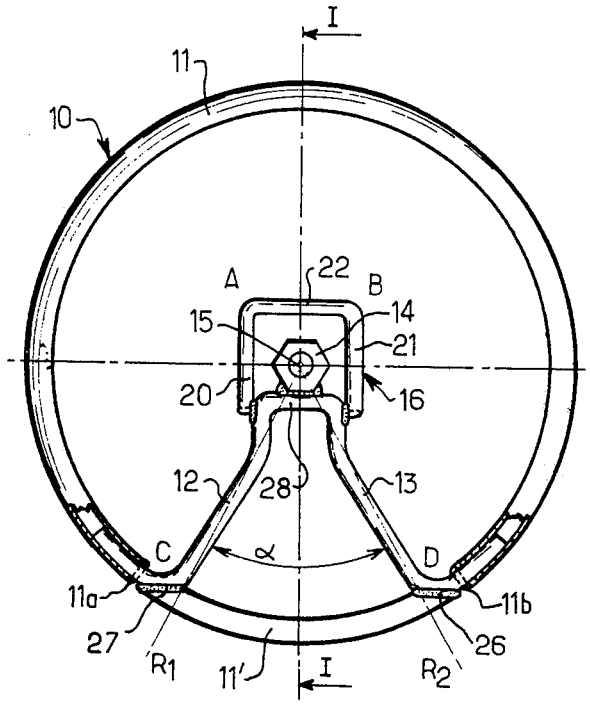
FIG. 2 is a view in the direction of the arrow II of FIG. 1 showing the steering-wheel with parts broken away.

According to the embodiment illustrated in FIGS. 1 and 2, the metal frame of a safety steering-wheel 10 according to the invention comprises essentially a rim 11 connected by two legs or branches 12,13 with a hub 14 which will be mounted at the end of the steering-column (not shown) of the vehicle. As seen in the plane of FIG. 2 parallel with the plane of the rim 11, forming a rim plane the legs 12,13, when projected onto the rim plane are directed substantially along two radii $R_1, R_2$ extending in proximity to one another and passing through the centre-line 15 of the hub of the steering-wheel, leaving the greater part of the rim, in the angle outside the angle $\alpha$, deprived of any point of attachment with a steering-wheel leg.

In addition to this relatively conventional structure, the steering-wheel comprises extensions of the legs 12,13 which, seen in the plane of FIG. 2, extend substantially in the opposite direction to that of the said legs with respect to the centre of the hub, thus forming a gallows-shaped complementary portion or member 16 inclined to the centre-line 15 (when projected onto the axial plane which contains axis 15 as shown in FIG. 1) and extending forwardly beyond the hub 14 but situated behind the rim 11.

The legs 12 and 13 and their extensions forming the gallows-shaped member 16 seen in the plane of FIG. 1, i.e., in a plane containing the centre-line of the hub and situated midway between the branches 12 and 13 form a stylized V having unequal curvilinear legs, the crest 17 of which is connected to the steering-wheel hub, whereas the end 18 of its longer leg is connected to the rim 11 and its other end 19 is free.

In the example illustrated in FIGS. 1 and 2, the gallows-shaped member 16 is constituted by an angled section including two substantially rectilinear extensions or feet 20, 21 welded on the legs 12 and 13 near the hub and interconnected by a portion 22 parallel with the plane of the rim 11. In FIG. 1, the outline of the portion 22 forms the tip 19 of the second or free end of the stylized V mentioned above.

According to the form of embodiment illustrated in FIGS. 1 and 2, the greater part 11 of the rim is constituted by a curved tube, whereas the legs 12 and 13 are constituted by a suitably bent wire, for example of steel. The end of the leg 12 is introduced into the end 11a of the portion 11 to which it is welded as diagrammatized at 24 (FIG. 4) by a small line perpendicular to the rim 11 and an arrow. Likewise, the end of the leg 13 is introduced into the end 11b of the portion 11 (FIG. 2) of the rim 11 on which it is welded as diagrammatized at 25 (FIG. 4). On the ends 11a, 11b of the portion 11 of the rim is welded a small rim arc 11' to close the circle as appears in FIG. 2 and as diagrammatized at 26,27 in FIG. 4. The portion 28 of the wire interconnecting the two legs 12 and 13 is welded to the hub 14 as appears in FIGS. 1 and 2, and as diagrammatized at 29 in FIGS. 3 and 4. The ends of the extensions 20, 21 are welded on the legs 12 and 13 near the hub as diagrammatized at 30, 31 in FIGS. 3 and 4.

In a conventional manner, the frame thus constituted, the construction of which is obviously simple, may be coated with any suitable coating material such as foam plastics, rubber or the like improving the external appearance and favoring shock absorption in the event of an accident.

Figure 5:
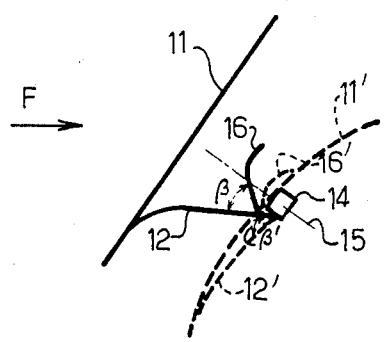
FIGS. 5 and 6 are diagrammatic views illustrating the manner in which the steering-wheel behaves in case of an accident to absorb the impact energy in two mutually opposite turning positions of the steering-wheel.
Figure 6:
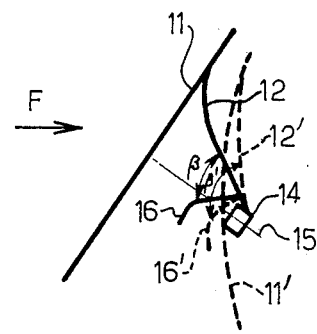

The operation of the safety steering-wheel in case of an accident is shown diagrammatically in FIGS. 5 and 6.

In these Figures, the reference numeral 15 indicates the centre-line of the steering-wheel with an inclination corresponding substantially to the position of use, whereas arrow F indicates the direction of the force applied by the driver (not shown) thrown against the steering-wheel in case of an accident. The heavy solid lines show the position of the steering-wheel before the accident and the dash lines show the position of the steering-wheel after its deformation and the absorption of the impact energy. In FIG. 5, the steering-wheel is in the normal driving position, i.e., the straight running position, whereas in FIG. 6 it is shown turned through substantially 180°, the legs 12, 13 being in the upper position.

Referring first to FIG. 5, the steering-wheel is shown to have been deformed and the legs to have yielded and bent as illustrated at 12', this permanent deformation having allowed much of the impact energy to be absorbed. The gallows-shaped member 16 has also been deformed as shown at 16', preventing any contact of the driver with the hub 14 of the steering-wheel. It is seen that the V formed by the steering-wheel legs with the gallows-shaped member has also been deformed, its opening angle $\beta$ having increased to $\beta'$.

Referring to FIG. 6, it is seen that in this position of the steering-wheel the impact has been mainly absorbed by the deformation of the gallows-shaped member 16 which has moved to 16', the leg 12 deformed as in 12' having absorbed only a small part of the impact. However, the driver has been protected from the hub 14.

Referring to FIGS. 2 and 4, it is seen that, in a plane in parallel relationship to the rim, the steering-wheel legs 12,13 and their extensions 20, 21, 22 substantially cover the surface of a trapezoid having its vertices at the points of attachment C, D of the legs on the rim and the points A, B of the extensions, which are substantially opposite the said points of attachment with respect to the hub centre. The relatively substantial area of this trapezoid ensures a good absorption of the impact energy and the least hazard of crushing of the driver's thorax. Moreover, the said trapezoid always acts efficiently whatever the position of the steering-wheel, the impact absorption efforts being distributed more or less between the legs 12,13 and the gallows-shaped member 16 depending upon the turning position of the steering-wheel.

Of course, a great number of modified forms of embodiment are possible.

In the form of embodiment illustrated in FIGS. 1 to 4, the steering-wheel is constituted essentially by a tubular rim 11, 11' to which a bent wire is welded to form the two steering-wheel legs or branches 12 and 13 on which is welded near the hub a gallows-shaped or substatially U-shaped wire member 16. The steering-wheel is thus constituted by four elements welded together at 24, 25, 26, 27, 29, 30 and 31 (FIG. 4).

Figure 7:
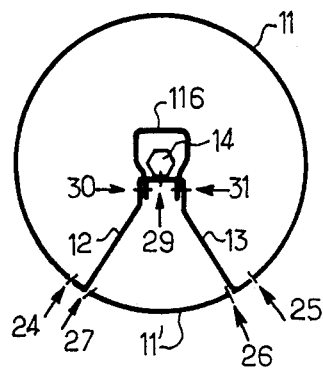
FIGS. 7 and 8 are diagrammatic views illustrating as in FIG. 4 two forms of embodiment.

In the modification diagrammatized in FIG. 7 an almost similar design is illustrated, with the only difference that the gallows-shaped member 116 is welded at 30, 31 on the legs 12, 13 of the steering-wheel and that it grows wider so as to provide a sufficient bearing area for impact absorption.

Figure 8:
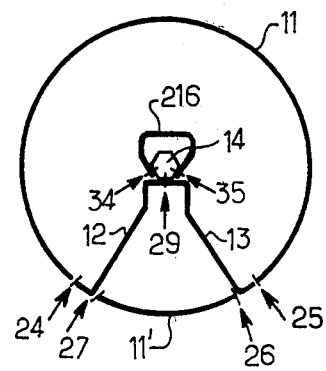

In the diagram of FIG. 8, another almost similar design is seen, wherein the gallows-shaped member 216 has its ends welded at 34, 35 directly on the hub 14 and not on the legs 12, 13 of the steering-wheel in proximity to the hub.

Figure 9:
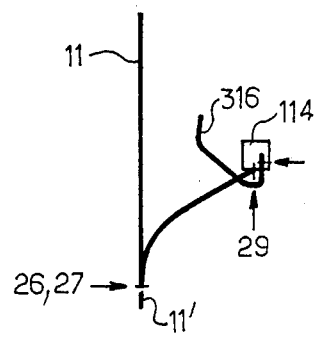
Figure 10:
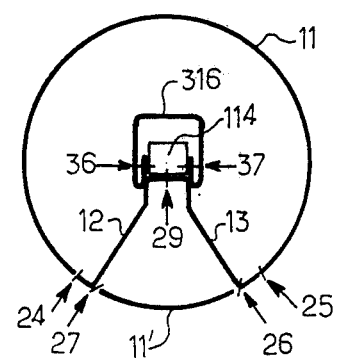

In the form of embodiment of FIGS. 9 and 10, the hub 114 is square in outer section and the gallows-shaped member 316 is constituted by a bent wire, the ends of which are welded at 36, 37 directly on two mutually opposite faces of the hub.

Figure 11:
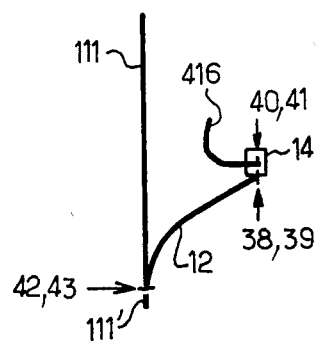
Figure 12:
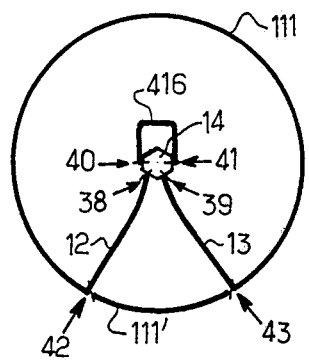

In the form of embodiment illustrated in FIGS. 11 and 12 the two legs 12 and 13 of the steering-wheel are constituted by the same wire or the same tube as the greater part 111 of the steering-wheel rim. The two ends of the legs 12 and 13 are welded directly at 38, 39 on the hub 14. The gallows-shaped member 416 is welded separately at 40, 41 on the hub. The rim 111 of the steering-wheel is completed by a small arc 111' welded at 42, 43, i.e., at the junctions with the legs 12 and 13.

Figure 13:
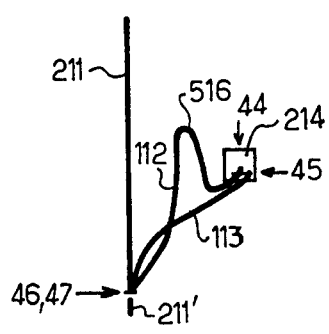
Figure 14:
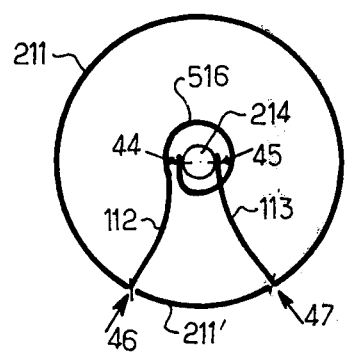

In the form of embodiment shown in FIGS. 13 and 14, the greater part of the rim, the legs and the gallows-shaped member of the steering-wheel are constituted by a single, suitably bent tube or wire element. A first end of this element is welded at 44 to the hub 214 and then winds helically for about ¾ of a turn with an increasing radius above the hub, this helix 516 replacing the aforesaid gallows-shaped member, thereafter becoming the leg 112 of the steering-wheel then, after a knee or sharp bend, the greater part 211 of the steering-wheel rim thereafter form, after a second knee or sharp bend, the second leg 113 of the steering-wheel, the end of which is welded at 45 on the hub 214. The two junctions between the legs 112, 113 and the rim 211 are interconnected by the complementary rim arc 211' which is welded thereto at 46,47.

Figure 15:
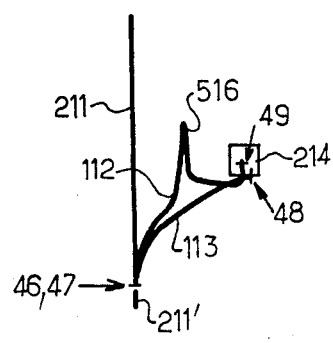
Figure 16:
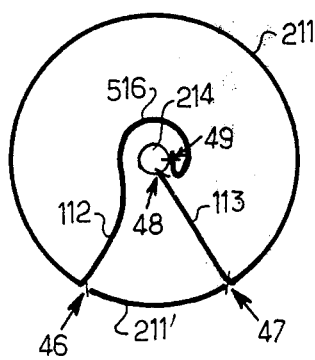

The form of embodiment illustrated in FIGS. 15 and 16 differs from the one shown in FIGS. 13 and 14 only by the fact that the single tube or wire element constituting the greater part 211 of the rim, the member 516 and the legs 112 and 113 of the steering-wheel, has its ends welded to the hub 214 not at mutually opposite points 44, 45 (FIG. 14), but at points 48, 49 in proximity to one another (FIG. 16); under such conditions, the helix 516 is reduced to only half a turn, the rest of the structure remaining practically unchanged.

The operation of the various forms of embodiment described remains substantially equivalent from one model to the other and it is well understood that infinite variants of shapes may be used without departing from the scope of the invention. The latter therefore comprises all technical equivalents to the means described as well as their combinations should the latter be carried out according to its gist and used within the scope of the following claims.

What is claimed is:

1. Safety steering-wheel including a central hub having a hub axis and a rim situated in a predetermined rim plane located in front of said central hub, the said steering-wheel including only two deformable legs fixed to said rim and inclined rearwardly therefrom toward said hub, with at least one of said legs being fixed to said hub, said legs when projected onto said rim plane being directed substantially along two radii in proximity to one another leaving a greater part of the rim which extends through more than 180° around said axis deprived of any point of attachment with a leg, at least one of said legs and said hub respectively having portions at least one of which is a fixing portion, the said steering-wheel comprising a complementary portion inclined to the axis of the hub, substantially in the shape of a gallows, having a pair of feet at least one of which is fixed near the hub to said fixing portion, and said complementary portion extending well in front of the hub, but behind the rim plane to a side of the hub axis opposite from said steering-wheel legs, said feet respectively forming substantially prolongations of the said legs when projected onto said rim plane.

2. Safety steering-wheel according to claim 1, wherein said complementary portion extends on said opposite side of the hub axis over about ⅓ of the radius of the rim.

3. Safety steering-wheel according to claim 1, wherein the said legs and their prolongations when projected onto an axial plane containing the axis of the hub and situated midway between the two said legs form a stylized V with unequal curvilinear legs which has its crest connected to the hub of the steering wheel and one end at its longer leg connected to the rim whereas the other end is free.

4. Safety steering-wheel according to claim 1, wherein the said legs and their prolongations have when projected onto said rim plane substantially the configuration of a trapezoid having its vertices at points of attachment of said legs on the rim and at points of the said prolongations which are substantially opposite the said points of attachment with respect to the axis of the hub.

5. Safety steering-wheel according to claim 1, wherein the said prolongations are constituted by an elongated member curved substantially in the shape of a U and secured to said fixing portion in proximity to said hub.

6. Safety steering-wheel according to claim 5, wherein the legs and the rim are constituted, except for a small center-angle interval of the rim comprised between the two legs, by a single, element.

7. Safety steering-wheel including a central hub having a hub axis and a rim situated in a predetermined rim plane located in front of said central hub, the said steering wheel including only two deformable legs fixed to said rim and inclined rearwardly therefrom toward said hub, with only one of said legs being fixed to said hub, said legs when projected onto said rim plane being directed substantially along two radii in proximity to one another leaving a greater part of the rim which extends through more than 180° around said axis deprived of any point of attachment with a leg, said steering wheel comprising a complementary portion inclined to the axis of the hub, substantially in the shape of a gallows, and having a pair of feet one of which is fixed to said hub, said complementary portion extending well in front of the hub, but behind the rim plane to a side of the hub axis opposite from said steering wheel legs, and the other of said feet of said complementary portion forming an integral prolongation of the other of said legs which is not fixed to said hub, the legs, the said complementary portion and the rim being constituted, except for a small center-angle rim interval comprised between the two legs, by a single element.

8. Safety steering-wheel according to claim 7, wherein said element from its foot secured to the hub winds helically with an increasing radius above the hub, thus forming a helix constituting the aforementioned gallows-shaped complementary portion, and then forming successively one of the legs of the steering-wheel, the greater part of the rim and the second steering-wheel leg, an end of which is secured to the hub, the said helix being arranged at the opposite side of the hub axis from said legs.

* * * * *